(12) United States Patent
Rodriguez

(10) Patent No.: US 11,433,767 B2
(45) Date of Patent: Sep. 6, 2022

(54) VEHICLE KILL SWITCH ASSEMBLY

(71) Applicant: George Rodriguez, Las Vegas, NV (US)

(72) Inventor: George Rodriguez, Las Vegas, NV (US)

(*) Notice: Subject to any disclaimer, the term of this patent is extended or adjusted under 35 U.S.C. 154(b) by 517 days.

(21) Appl. No.: 16/574,883

(22) Filed: Sep. 18, 2019

(65) Prior Publication Data

US 2021/0078404 A1 Mar. 18, 2021

(51) Int. Cl.
| | | |
|---|---|---|
| *B60K 28/04* | (2006.01) | |
| *B60N 2/00* | (2006.01) | |
| *B60K 26/02* | (2006.01) | |
| *F02P 11/00* | (2006.01) | |

(52) U.S. Cl.
CPC .............. *B60K 28/04* (2013.01); *B60K 26/02* (2013.01); *B60N 2/002* (2013.01); *F02P 11/00* (2013.01); *B60Y 2300/43* (2013.01)

(58) Field of Classification Search
CPC ........ B60K 28/04; B60K 26/02; B60N 2/002; F02P 11/00; B60Y 2300/43
USPC ....................................................... 297/217.3
See application file for complete search history.

(56) References Cited

U.S. PATENT DOCUMENTS

| | | | |
|---|---|---|---|
| 3,500,946 A | 3/1970 | Boyajian | |
| 3,736,729 A | 6/1973 | Peterson | |
| 4,795,865 A | 1/1989 | Howard | |
| 5,124,512 A | 6/1992 | Huettner | |
| 5,706,909 A * | 1/1998 | Bevins | B60R 25/25 188/162 |
| 6,359,245 B1 | 3/2002 | Wahls | |
| 6,448,512 B1 | 9/2002 | Cooper | |
| 6,879,261 B2 | 4/2005 | Nishino | |
| 8,025,119 B2 | 9/2011 | Nemec | |
| 8,393,432 B2 | 3/2013 | Boyarski | |
| 8,783,722 B1* | 7/2014 | Gallo | B60R 22/321 280/801.1 |
| 2014/0277973 A1* | 9/2014 | Nedorezov | B60R 25/00 701/53 |

* cited by examiner

*Primary Examiner* — Gertrude Arthur Jeanglaude

(57) ABSTRACT

A vehicle kill switch assembly includes a switch that is coupled to a vehicle. The switch is positioned beneath a driver's seat of the vehicle and the switch is electrically coupled to the ignition system of the vehicle. The ignition system is turned off when the switch is disengaged. A biasing unit is coupled to the vehicle and the driver's seat is coupled to the biasing unit. The biasing unit biases the driver's seat upwardly in the vehicle and the biasing unit is compressed when the driver sits in the driver's seat. The switch is engaged when the biasing unit is compressed to facilitate the vehicle to be driven. Conversely, the switch is disengaged when the biasing unit biases the driver's seat upwardly to inhibit the vehicle from being driven.

7 Claims, 4 Drawing Sheets

VEHICLE KILL SWITCH ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to kill switch devices and more particularly pertains to a new kill switch device for disabling a vehicle when a driver falls out of the driver's seat.

(2) Description of Related Art Including Information Disclosed Under 37 CFR 1.97 and 1.98

The prior art relates to kill switch devices.

BRIEF SUMMARY OF THE INVENTION

An embodiment of the disclosure meets the needs presented above by generally comprising a switch that is coupled to a vehicle. The switch is positioned beneath a driver's seat of the vehicle and the switch is electrically coupled to the ignition system of the vehicle. The ignition system is turned off when the switch is disengaged. A biasing unit is coupled to the vehicle and the driver's seat is coupled to the biasing unit. The biasing unit biases the driver's seat upwardly in the vehicle and the biasing unit is compressed when the driver sits in the driver's seat. The switch is engaged when the biasing unit is compressed to facilitate the vehicle to be driven. Conversely, the switch is disengaged when the biasing unit biases the driver's seat upwardly to inhibit the vehicle from being driven.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
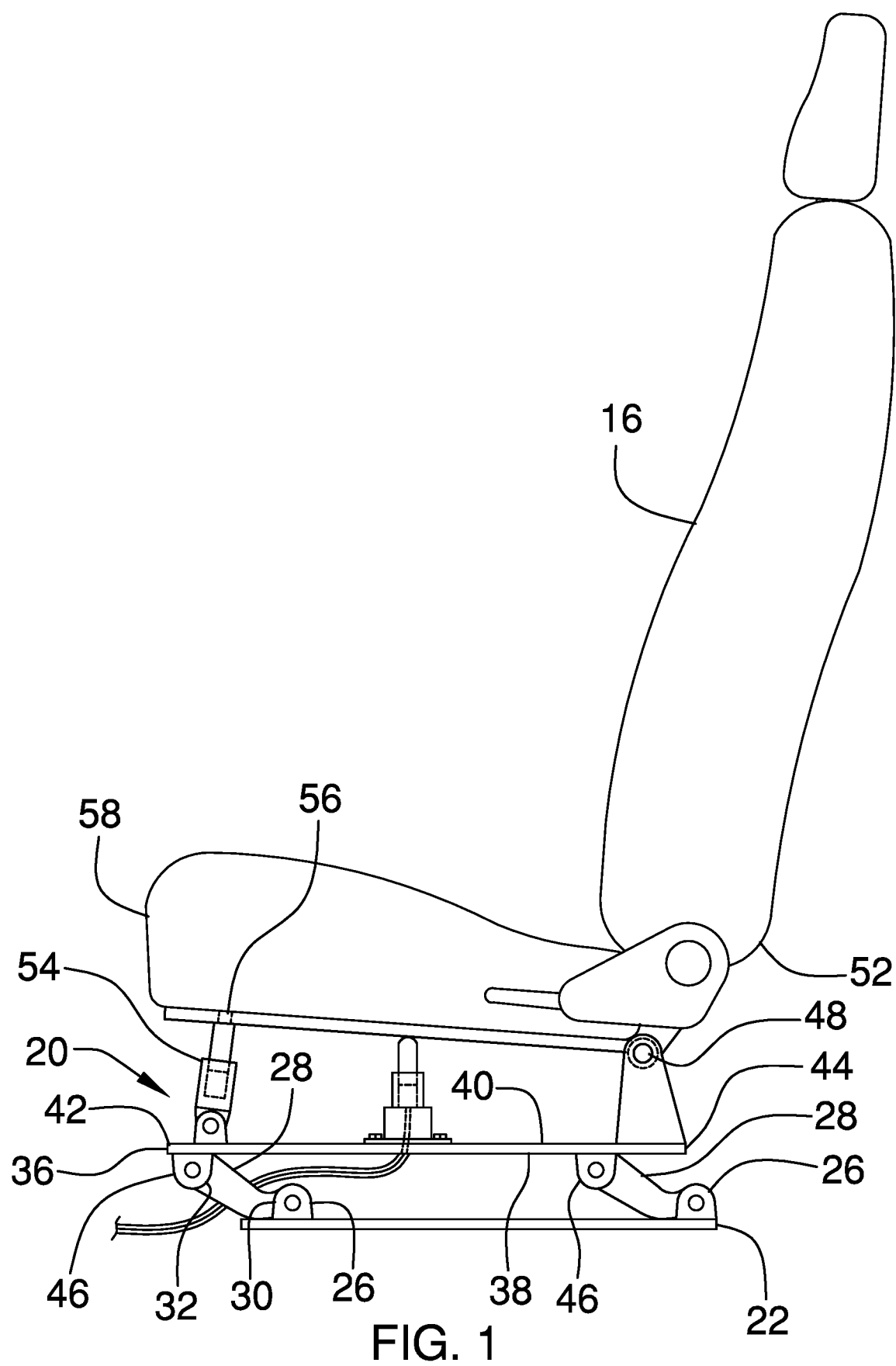
FIG. 1 is a left side view of a vehicle kill switch assembly according to an embodiment of the disclosure showing a vehicle seat being biased upwardly.
Figure 2:
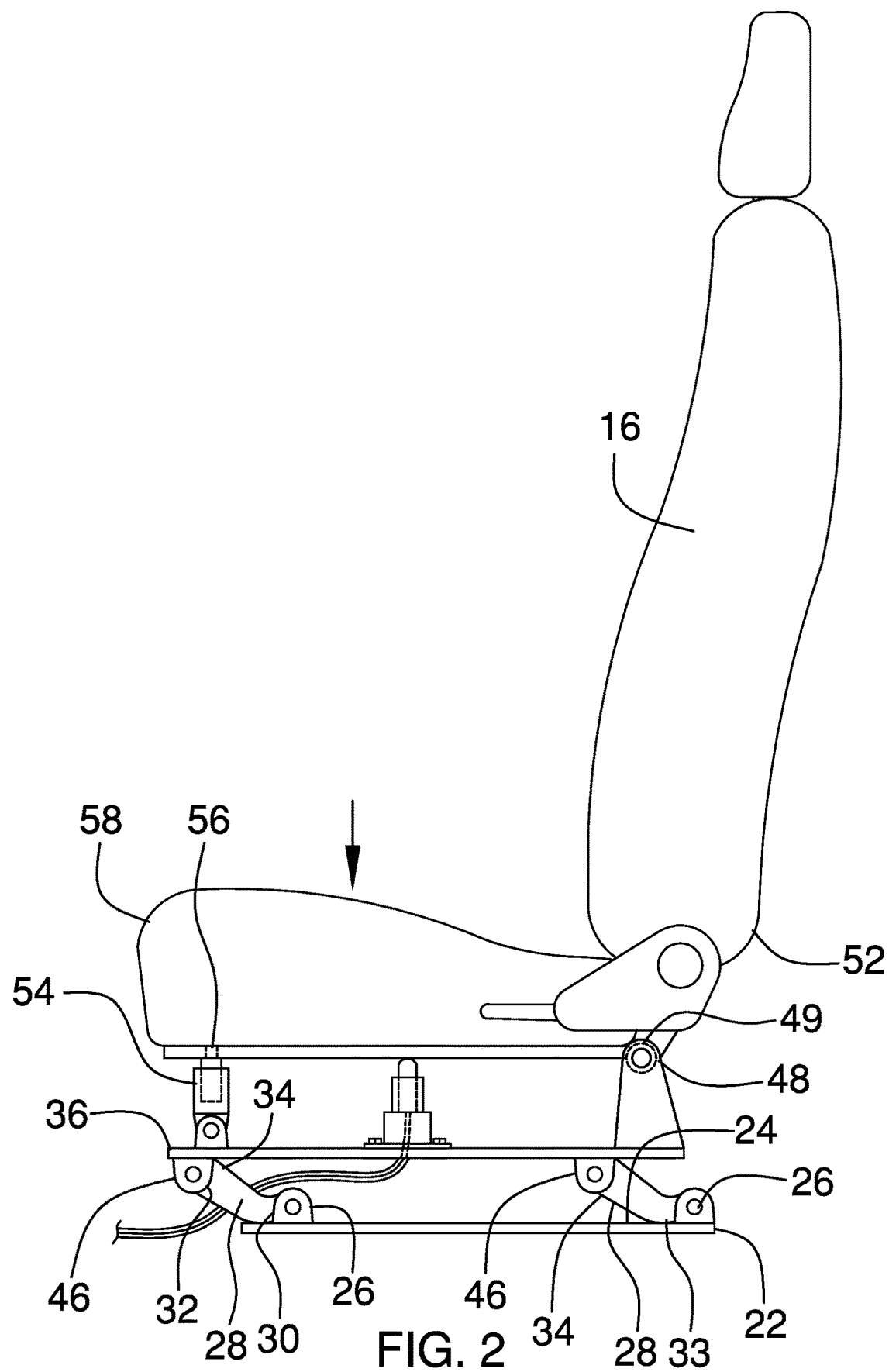
FIG. 2 is a left side view of an embodiment of the disclosure showing a vehicle seat being urged downwardly.
Figure 3:
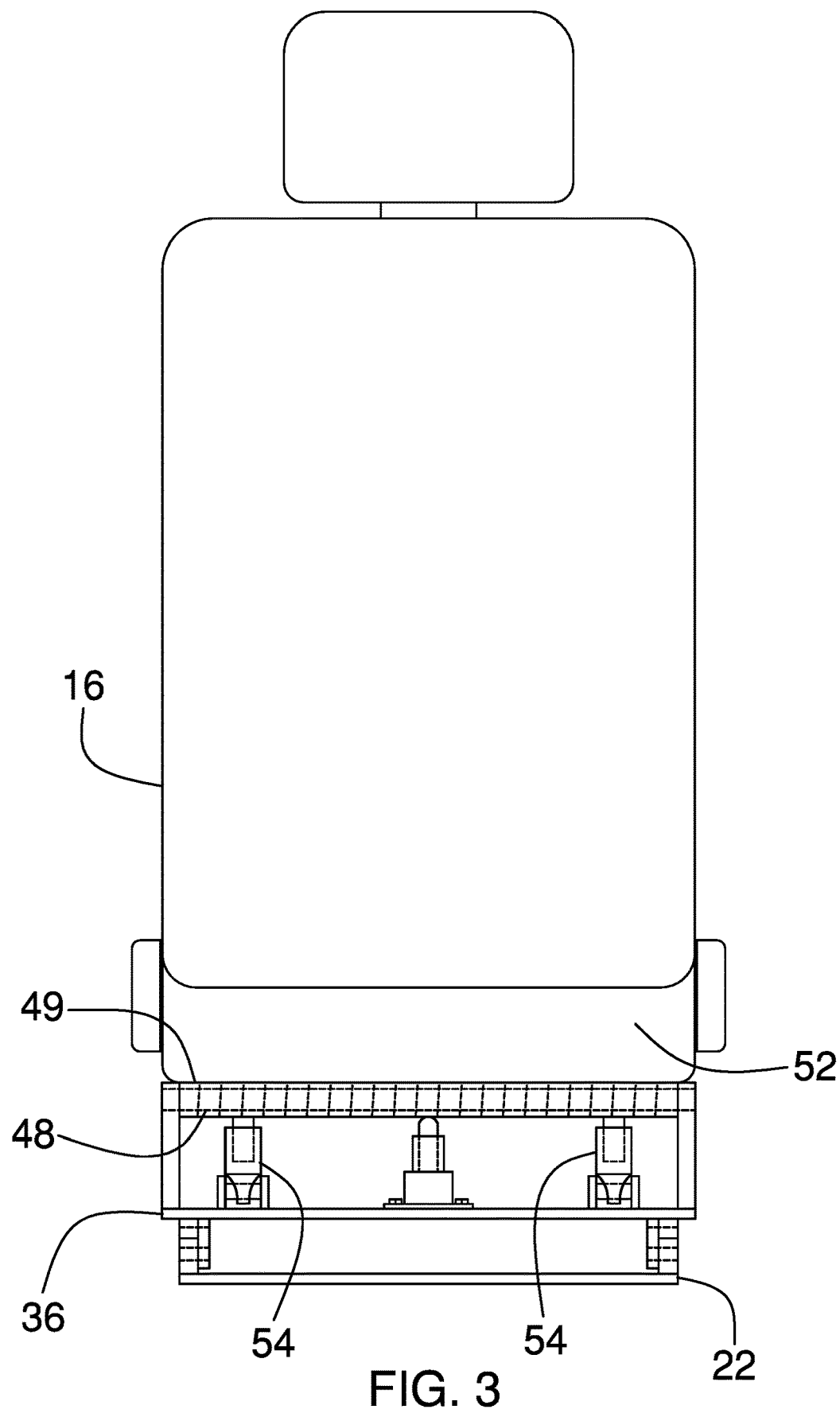
FIG. 3 is a back phantom view of an embodiment of the disclosure.
Figure 4:
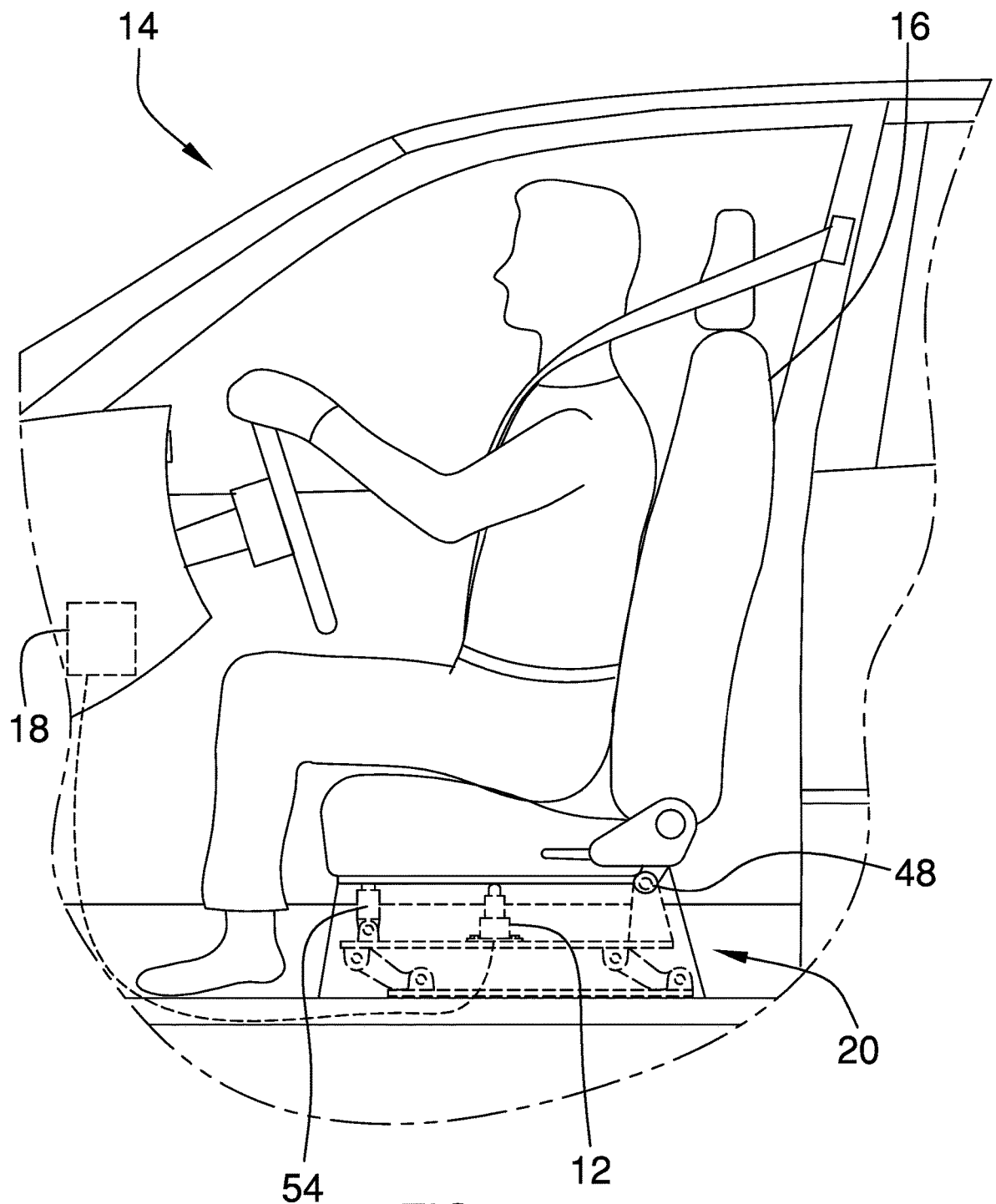
FIG. 4 is a perspective in-use view of an embodiment of the disclosure.

With reference now to the drawings, and in particular to FIGS. 1 through 4 thereof, a new kill switch devices embodying the principles and concepts of an embodiment of the disclosure and generally designated by the reference numeral 10 will be described.

As best illustrated in FIGS. 1 through 4, the vehicle kill switch assembly 10 generally comprises a switch 12 that is coupled to a vehicle 14. The switch 12 is positioned beneath a driver's seat 16 of the vehicle 14 and the switch 12 is electrically coupled to the ignition system 18 of the vehicle 14. The ignition system 18 is turned off when the switch 12 is disengaged. The vehicle 14 may be a passenger vehicle, a cargo vehicle or any other motorized vehicle that is driven on public roadways.

A biasing unit 20 is provided and the biasing unit 20 is coupled to the vehicle 14. The driver's seat 16 is coupled to the biasing unit 20. The biasing unit 20 biases the driver's seat 16 upwardly in the vehicle 14. Conversely, the biasing unit 20 is compressed when the driver sits in the driver's seat 16. The switch 12 is engaged when the biasing unit 20 is compressed thereby facilitating the vehicle 14 to be driven. The switch 12 is disengaged when the biasing unit 20 biases the driver's seat 16 upwardly to inhibit the vehicle 14 from being driven. In this way the vehicle 14 is disabled when the driver falls out of the driver's seat 16 for any reason.

The biasing unit 20 comprises a lower mounting plate 22 that is coupled to the vehicle 14 and the lower mounting plate 22 is positioned beneath the driver's seat 16. The lower mounting plate 22 has a top side 24 and the top side 24 has a plurality of lower engagement points 26 thereon. A plurality of arms 28 is provided and each of the arms 28 has a first end 30 and a second end 32. The first end 30 of each of the arms 28 is pivotally coupled to a respective one of the lower engagement points 26. Each of the arms 28 has a first portion 33 oriented at an angle with a second portion. The first portion 33 of each of the arms 28 lies on the top side 24 of the lower mounting plate 22 having the second portion 34 extending upwardly from the top side 24 of the lower mounting plate 22. In this way the second end 32 of the arms 28 is inhibited from being lowered toward the lower mounting plate 22.

The biasing unit 20 includes an upper mounting plate 36 and the upper mounting plate 36 has a lower side 38, an upper side 40, a front edge 42 and a back edge 44. The lower side 38 has a plurality of upper engagement points 46 thereon. The second end 32 of each of the arms 28 is pivotally coupled to a respective one of the upper engagement points 46. In this way the upper mounting plate 36 is spaced upwardly from the lower mounting plate 22.

A hinge 48 is coupled to and extends upwardly from the upper side 40 of the upper mounting plate 36. The hinge 48 has a distal end 49 with respect to the upper side 40 and the hinge 48 is positioned adjacent to the back edge 44 of the upper mounting plate 36. The distal end 48 engages a bottom side 50 of the driver's seat 16 along a back side 52 of the driver's seat 16. The hinge 48 may comprise a torsion hinge, a spring loaded hinge other type of hinge that is biased to rotate in one direction.

A plurality of biasing members 54 is each coupled to and extends upwardly from the upper side 40 of the upper mounting plate 36. Each of the biasing members 54 has a distal end 56 with respect to the upper side 40. The distal end 56 of each of the biasing members 54 is biased away from the upper side 40. The distal end 56 of each of the biasing members 54 is urgeable toward the top side 24. Each of the biasing members 54 is positioned adjacent to the front edge 42 of the upper mounting plate 36. The distal end 56 of each of the biasing members 54 is coupled to the bottom side 50 of the driver's seat 16 along a front side 58 of the driver's seat 16. Each of the biasing members 54 may comprise a gas charged shock absorber, a spring or any other type of biasing member that can be compressed by the weight of an average human being.

The switch 12 is positioned on the upper side 40 of the mounting plate and the switch 12 is positioned between the hinge 48 and the biasing members 54. The bottom side 50 of the driver's seat 16 is angled downwardly between the hinge 48 and the biasing members 54 when the driver sits in the driver's seat 16. In this way the switch 12 is engaged and the ignition system 18 of the vehicle 14 is turned on. The bottom side 50 of the driver's seat 16 is angled upwardly between the biasing members 54 and the hinge 48 when the driver is not sitting in the driver's seat 16. In this way the switch 12 is disengaged and the ignition system 18 of the vehicle 14 is turned off.

In use, the switch 12 is engaged when the driver sits in the driver's seat 16 of the vehicle 14. Thus, the ignition system 18 is turned on to facilitate the vehicle 14 to be driven. The switch 12 is disengaged when the driver is not sitting in the driver's seat 16, possibly because the driver has fallen out of the driver's seat 16 due to becoming physically impaired. In this way the ignition system 18 is turned off. Thus, the vehicle 14 will come to a stop when the driver is incapacitated thereby reducing the likelihood that the vehicle 14 will cause an accident involving other vehicles.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle kill switch assembly being configured to turn off the engine of a vehicle when the driver falls out of the driver's seat, said assembly comprising:

a switch being coupled to a vehicle, said switch being positioned beneath a driver's seat of the vehicle, said switch being electrically coupled to the ignition system of the vehicle, said ignition system being turned off when said switch is disengaged;

a biasing unit being coupled to the vehicle, said biasing unit having the driver's seat being coupled thereto, said biasing unit biasing the driver's seat upwardly in the vehicle, said biasing unit being compressed when the driver sits in the driver's seat, said switch being engaged when said biasing unit is compressed wherein said switch is configured to facilitate the vehicle to be driven, said switch being disengaged when said biasing unit biases the driver's seat upwardly wherein said switch is configured to inhibit the vehicle from being driven; and wherein said biasing unit comprises a lower mounting plate being coupled to the vehicle, said lower mounting plate being positioned beneath the driver's seat, said lower mounting plate having a top side, said top side having a plurality of lower engagement points thereon.

2. The assembly according to claim 1, wherein said biasing unit comprises a plurality of arms, each of said arms having a first end and a second end, said first end of each of said arms being pivotally coupled to a respective one of said lower engagement points.

3. The assembly according to claim 2, wherein said biasing unit includes an upper mounting plate, said upper mounting plate having a lower side, an upper side, a front edge and a back edge, said lower side having a plurality of upper engagement points thereon, each of said upper engagement points having said second end of each of said arms being pivotally coupled thereto such that said upper mounting plate is spaced upwardly from said lower mounting plate.

4. The assembly according to claim 3, wherein said biasing unit includes a hinge being coupled to and extending upwardly from said upper side of said upper mounting plate, said hinge having a distal end with respect to said upper side, said hinge being positioned adjacent to said back edge of said upper mounting plate, said distal end engaging a bottom side of the driver's seat along a back side of the driver's seat.

5. The assembly according to claim 3, said biasing unit includes a plurality of biasing members, each of said biasing members being coupled to and extending upwardly from said upper side of said upper mounting plate, each of said biasing members having a distal end with respect to said upper side, said distal end of each of said biasing members being biased away from said upper side, said distal end of each of said biasing members being urgeable toward said top side, each of said biasing members being positioned adjacent to said front edge of said upper mounting plate.

6. The assembly according to claim 5, wherein said distal end of each. of said biasing members is coupled to the bottom side of the driver's seat along a front side of the driver's seat, said switch being positioned on said upper side of said mounting plate, said switch being positioned between said hinge and said biasing members, the bottom side of the driver's seat being angled downwardly between said hinge and said. biasing members when the driver sits in the driver's seat such that said switch is engaged, the bottom side of the driver's seat being angled upwardly between said biasing members and said hinge when the driver is not sitting in the driver's seat such that said switch is disengaged.

7. A vehicle kill switch assembly being configured to turn off the engine of a vehicle when the driver falls out of the driver's seat, said assembly comprising:
- a switch being coupled to a vehicle, said switch being positioned beneath a driver's seat of the vehicle, said switch being electrically coupled to the ignition system of the vehicle, said ignition system being turned off when said switch is disengaged; and
- a biasing unit being coupled to the vehicle, said biasing unit having the driver's seat being coupled thereto, said biasing unit biasing the driver's seat upwardly in the vehicle, said biasing unit being compressed when the driver sits in the driver's seat, said switch being engaged when said biasing unit is compressed wherein said switch is configured to facilitate the vehicle to be driven, said switch being disengaged when said biasing unit biases the driver's seat upwardly wherein said switch is configured to inhibit the vehicle from being driven, said biasing unit comprising:
  - a lower mounting plate being coupled to the vehicle, said lower mounting plate being positioned beneath the driver's seat, said lower mounting plate having a top side, said top side having a plurality of lower engagement points thereon;
  - a plurality of arms, each of said arms having a first end and a second end, said first end of each of said arms being pivotally coupled to a respective one of said lower engagement points;
  - an upper mounting plate, said upper mounting plate having a lower side, an upper side, a front edge and a back edge, said lower side having a plurality of upper engagement points thereon, each of said upper engagement points having said second end of each of said arms being pivotally coupled thereto such that said upper mounting plate is spaced upwardly from said lower mounting plate;
  - a hinge being coupled to and extending upwardly from said upper side of said upper mounting plate, said hinge having a distal end with respect to said upper side, said hinge being positioned adjacent to said back edge of said upper mounting plate, said distal end engaging a bottom side of the driver's seat along a back side of the driver's seat; and
  - a plurality of biasing members, each of said biasing members being coupled to and extending upwardly from said upper side of said upper mounting plate, each of said biasing members having a distal end with respect to said upper side, said distal end of each of said biasing members being biased away from said upper side, said distal end of each of said biasing members being urgeable toward said top side, each of said biasing members being positioned adjacent to said front edge of said upper mounting plate, said distal end of each of said biasing members being coupled to the bottom side of the driver's seat along a front side of the driver's seat, said switch being positioned on said upper side of said mounting plate, said switch being positioned between said hinge and said biasing members, the bottom side of the driver's seat being angled downwardly between said hinge and said biasing members when the driver sits in the driver's seat such that said switch is engaged, the bottom side of the driver's seat being angled upwardly between said biasing members and said hinge when the driver is not sitting in the driver's seat such that said switch is disengaged.

\* \* \* \* \*